(12) United States Patent
Hoekstra

(10) Patent No.: US 11,899,254 B2
(45) Date of Patent: Feb. 13, 2024

(54) PHOTONIC INTEGRATED CIRCUIT AND OPTO-ELECTRONIC SYSTEM COMPRISING THE SAME

(71) Applicant: EFFECT PHOTONICS B.V., Eindhoven (NL)

(72) Inventor: Tsjerk Hans Hoekstra, Eindhoven (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 38 days.

(21) Appl. No.: 17/695,935

(22) Filed: Mar. 16, 2022

(65) Prior Publication Data

US 2022/0308298 A1 Sep. 29, 2022

(30) Foreign Application Priority Data

Mar. 24, 2021 (EP) ..................................... 21164748

(51) Int. Cl.
*G02B 6/42* (2006.01)

(52) U.S. Cl.
CPC ......... *G02B 6/4253* (2013.01); *G02B 6/4239* (2013.01); *G02B 6/4243* (2013.01)

(58) Field of Classification Search
CPC ... G02B 6/4253; G02B 6/4239; G02B 6/4243
USPC .......................................................... 385/14
See application file for complete search history.

(56) References Cited

U.S. PATENT DOCUMENTS

| 5,703,974 | A | 12/1997 | Sasaki et al. |
| 7,116,880 | B1 | 10/2006 | Liu et al. |
| 10,962,711 | B2 | 3/2021 | Chang et al. |

(Continued)

FOREIGN PATENT DOCUMENTS

| CN | 109425931 A | 3/2019 |
| CN | 112327412 A | 2/2021 |
| JP | 03278030 A1 | 12/1991 |

(Continued)

OTHER PUBLICATIONS

Japanese Office Action for corresponding Japanese Application 2022-040862 dated Mar. 7, 2023.

(Continued)

*Primary Examiner* — Jerry M Blevins
(74) *Attorney, Agent, or Firm* — Hudak, Shunk & Farine Co. LPA

(57) ABSTRACT

A photonic integrated circuit including an InP-based substrate that is provided with a first InP-based optical waveguide and a neighboring second InP-based optical waveguide, a dielectric planarization layer that is arranged at least between the first optical waveguide and the second optical waveguide. At least between the first optical waveguide and the neighboring second optical waveguide, the dielectric planarization layer is provided with a recess that is arranged to reduce or prevent optical interaction between the first optical waveguide and the second optical waveguide via the dielectric planarization layer. At the location of the recess, the dielectric planarization layer has a first sidewall that is arranged sloped towards the first optical waveguide, and a second sidewall that is arranged sloped towards the second optical waveguide. An opto-electronic system including said PIC.

20 Claims, 5 Drawing Sheets

(56) References Cited

U.S. PATENT DOCUMENTS

| 11,585,979 B2 | 2/2023 | Kuindersma et al. |
| 2005/0117834 A1* | 6/2005 | Joyner .................. H01S 5/2231 385/14 |

FOREIGN PATENT DOCUMENTS

| JP | 6-313818 A | 11/1994 |
| JP | 11-352344 A | 12/1999 |
| JP | 2020-101599 A | 7/2020 |
| TW | 202021084 A | 6/2020 |
| TW | 202032752 A | 9/2020 |
| WO | 2020/175236 A1 | 3/2020 |

OTHER PUBLICATIONS

Taiwanese Search Report for corresponding Taiwanese Patent Application No. 111109064 dated Mar. 17, 2023.

* cited by examiner

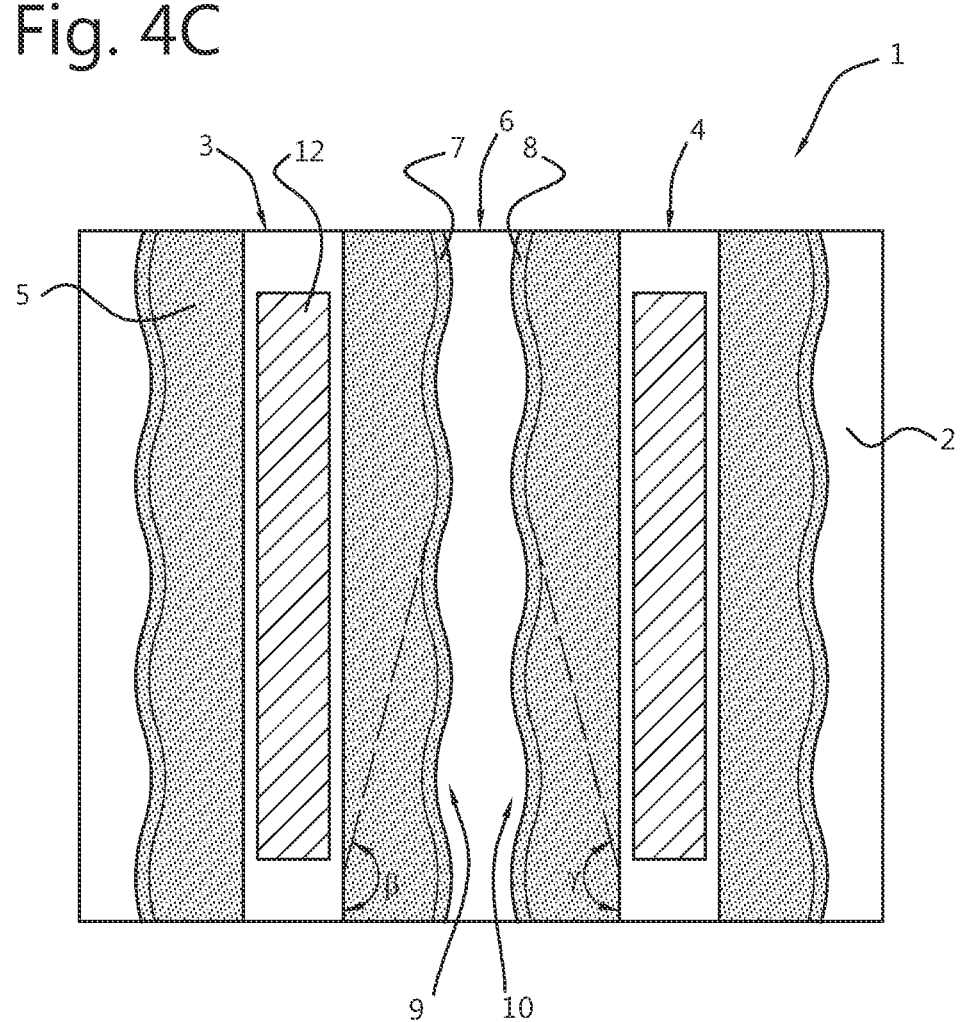

PHOTONIC INTEGRATED CIRCUIT AND OPTO-ELECTRONIC SYSTEM COMPRISING THE SAME

FIELD OF THE INVENTION

The present invention relates to an indium phosphide (InP)-based photonic integrated circuit (PIC) that can be used for example but not exclusively for telecommunication applications or sensor applications. The invention further relates to an opto-electronic system, which can be used for example but not exclusively for telecommunication applications or sensor applications, wherein the opto-electronic system comprises said InP-based PIC.

BACKGROUND OF THE INVENTION

PICs, for example but not exclusively in the field of optical telecommunication applications, are becoming increasingly complex because of the increasing number of optical and electrical functions that are integrated on a single die that preferably has a footprint that is as small as possible. The most versatile technology platform for PICs especially for optical telecommunication applications uses wafers comprising InP-based semiconductor materials. InP-based technology enables monolithic integration of both active components such as for example light-generating and/or light-absorbing optical devices, and passive components such as for example light-guiding and/or light-switching optical devices, in one PIC on a single die.

A common problem related to PICs having a high component density is optical cross-talk or inter-waveguide interference between neighboring optical waveguides. Solutions known in the art for reducing optical cross-talk or inter-waveguide interference resulted in disadvantages such as for example relating to intra-waveguide interference that is caused by optical radiation that is reflected back into the originating waveguide. Known solutions for obviating the latter disadvantage, in turn, introduced other disadvantages for example relating to environmental protection of the PICs especially when hermetic packaging of the complex PICs is cumbersome and therefore costly.

Based on the above, there is a need to provide a PIC that is less prone to inter-waveguide and intra-waveguide interference and that allows for an improved performance-to-cost ratio.

SUMMARY OF THE INVENTION

It is an object of the present invention to provide an InP-based PIC, which can be used for example but not exclusively for telecommunication applications or sensor applications, pre-empting or at least reducing at least one of the above-mentioned and/or other disadvantages associated with complex InP-based PICs known in the art.

It is also an object of the present invention to provide an opto-electronic system that can be used for example but not exclusively for telecommunication applications or sensor applications comprising a PIC according to the invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the abovementioned objects is achieved by a photonic integrated circuit, PIC, comprising:

an indium phosphide, InP,-based substrate that is provided with a first InP-based optical waveguide and a neighboring second InP-based optical waveguide;

a dielectric planarization layer that is arranged at least between the first optical waveguide and the second optical waveguide, wherein at least between the first optical waveguide and the second optical waveguide, the dielectric planarization layer is provided with:

a recess that is arranged to reduce or prevent optical interaction between the first optical waveguide and the second optical waveguide via the dielectric planarization layer;

wherein at the location of the recess, the dielectric planarization layer has:

a first sidewall that is arranged sloped towards the first optical waveguide; and a second sidewall that is arranged sloped towards the second optical waveguide.

By increasing the difference between refractive indices of InP-based layers of an InP-based PIC that constitute InP-based optical waveguides, it is possible to decrease dimensions of the InP-based optical waveguides. This allows reducing the die area of the PIC and therefore the costs of the PIC as a whole. To exploit the active optical properties of the InP-based optical waveguides, they need to be provided with electrical contacts. To enable accurate and reliable fabrication of electrical contacts on top of optical waveguides having small dimensions, a dielectric planarization layer usually is applied. Furthermore, the dielectric planarization layer may be configured to provide passivation and protection of the optical waveguides thereby improving the environmental protection of the PIC according to the invention.

It is noted that the dielectric planarization layer may capture and propagate optical radiation originating from an optical waveguide. To at least reduce and ultimately prevent optical interaction such as inter-waveguide interference or optical cross-talk between the first optical waveguide and the second neighboring optical waveguide of the PIC via the dielectric planarization layer, at least between the first optical waveguide and the second optical waveguide, the dielectric planarization layer is provided with a recess.

By providing a slope to the first sidewall and the second sidewall of the dielectric planarization layer, a phase front of optical radiation captured by the dielectric planarization layer can be tilted thereby at least reducing and ultimately preventing the optical radiation that is incident on the first sidewall and the second sidewall to be reflected back into the originating optical waveguide, i.e. the first optical waveguide and/or the second optical waveguide, respectively. As a result, intra-waveguide interference in the first optical waveguide and/or the second optical waveguide, respectively can at least be reduced and ultimately be prevented. Hence, the PIC according to the present invention is less prone to inter-waveguide and intra-waveguide interference.

Furthermore, providing the dielectric planarization layer with a recess that is bounded by a first sidewall and a second sidewall that are sloped towards the first optical waveguide and the second optical waveguide, respectively, provides additional advantages in particular regarding metallization processes, mechanical stress reduction and/or mechanical stress redistribution in additional dielectric layers that can be arranged on top of the dielectric planarization layer, and capture of residues in for example corners between the sloped sidewalls of the dielectric planarization layer and the InP-based substrate.

With respect to metallization processes, it is noted that the first sidewall and the second sidewall of the dielectric planarization layer that are sloped in the direction as mentioned-above, enable good step coverage of metal layers that are arranged to conform to these sloped sidewalls of the dielectric planarization layer and/or further metal layers that are arranged to conform to sidewalls of additional dielectric layers that are sloped because of the sloped sidewalls of the dielectric planarization layers on top of which they are deposited. The good step coverage provided by the sloped sidewalls of the dielectric planarization layer enable the use of anisotropic metal deposition and metal etching techniques.

With respect to additional dielectric layers that are deposited on top of the dielectric planarization layer that is provided with a recess that is bounded by the sloped first and second sidewalls of the dielectric planarization layer, it is noted that it is possible to reduce mechanical stress raisers and/or to redistribute mechanical stress in additional dielectric layers that are arranged to at least cover the recess, by allowing a first additional dielectric layer of the additional dielectric layers at the location of the recess to be in contact with an area of a layer that is arranged underneath the dielectric planarization layer. The layer that is arranged underneath the dielectric planarization layer can be any suitable dielectric layer or InP-based layer.

With respect to capture of residues in for example corners between the sloped sidewalls of the dielectric planarization layer and the InP-based substrate, it is noted that the first sloped sidewall and the second sloped sidewall of the dielectric planarization layer enable less residues to be captured compared to sidewall that are arranged at an angle of 90 degrees with respect to the InP-based substrate.

Based on the above, the person skilled in the art will appreciate that the dielectric planarization layer of the PIC according to the invention can be construed as a multifunctional layer. The person skilled in the art will appreciate that prevention of inter-waveguide interference and intra-waveguide interference could be achieved by completely removing the dielectric planarization layer after having provided the InP-based optical waveguides with electrical contacts. However, in that case the above-mentioned additional advantages provided by the multifunctional dielectric planarization layer of the PIC according to the invention will not be available.

The person skilled in the art will appreciate that the InP-based substrate can be provided with any suitable number of InP-based optical waveguides. Inter-waveguide interference and/or intra-waveguide interference between any number of neighboring optical waveguides can at least be reduced and ultimately be prevented by providing the dielectric planarization layer between neighboring optical waveguides with at least one recess in the way described above. Therefore, depending on the specific requirements of the PIC, it is possible that more than one recess is provided between some or all of the neighboring optical waveguides.

Based on the above, the person skilled in the art will appreciate that the InP-based PIC according to the invention pre-empts or at least reduces at least one of the above-mentioned and/or other disadvantages associated with inter-waveguide interference and intra-waveguide interference. Moreover, the multifunctional dielectric planarization layer of the PIC according to the invention provides additional technical advantages for example regarding environmental protection, metallization processes, mechanical stress reduction and/or mechanical stress redistribution in additional dielectric layers, and capture of residues. As a result, the person skilled in the art will appreciate that the PIC according to the present invention provides an improved overall performance in combination with an improved performance-to-cost ratio.

In an embodiment of the photonic integrated circuit according to the invention, at the location of the recess, the first sidewall and the second sidewall of the dielectric planarization layer are at an inclination angle to the InP-based substrate that is less than 85 degrees.

In this way, it is possible to reduce and ultimately prevent that optical radiation that is incident on the first sloped sidewall and the second sloped sidewall of the dielectric planarization layer is reflected back into the originating optical waveguide, i.e. the first optical waveguide and/or the second optical waveguide, respectively. As a result, intra-waveguide interference in the first optical waveguide and/or the second optical waveguide, respectively can at least be reduced and ultimately be prevented.

It is noted that the above-mentioned reduction of mechanical stress raisers and/or redistribution of mechanical stress in additional dielectric layers that are arranged to at least cover the recess that is provided in the dielectric planarization layer, can be optimized by tailoring the inclination angle within the above-mentioned range, for example by choosing the inclination angle to be in a range between 30 degrees and 70 degrees.

In an embodiment of the photonic integrated circuit according to the invention, the recess is arranged to provide access to the InP-based substrate.

In accordance with this embodiment of the PIC, the recess is a through-hole that provides access to an area of the InP-based substrate that is otherwise at least partially in contact with the dielectric planarization layer. The person skilled in the art will appreciate that in this case the inter-waveguide interference between the first optical waveguide and the second neighboring optical waveguide of the PIC via the dielectric planarization layer is completely prevented. The sloped first sidewall and second sidewall of the dielectric planarization layer allow reduction and ultimately prevention of the intra-waveguide interference mentioned above.

In relation to the above-mentioned additional dielectric layers that are deposited on top of the dielectric planarization layer, it is noted that the first additional dielectric layer of the additional dielectric layers is allowed to be in contact with the area of the InP-based substrate at the location of the recess. As a result, it is possible to reduce mechanical stress raisers and/or to redistribute mechanical stress in the additional dielectric layers that are arranged to at least cover the recess.

In an embodiment of the photonic integrated circuit according to the invention, the recess has an elongated shape and is arranged to extend longitudinally between the first InP-based optical waveguide and the second InP-based optical waveguide.

The person skilled in the art will appreciate that the recess can have any suitable shape as long as it allows at least reduction and ultimately prevention of inter-waveguide interference and intra-waveguide interference associated with the first InP-based optical waveguide and the second neighboring InP-based optical waveguide. The recess can have an elongated shape such as for example a trench.

In an embodiment of the photonic integrated circuit according to the invention, the first sidewall of the dielectric planarization layer is at least partially provided with a first pattern in accordance with which the first sidewall is at least partially arranged at a first angle with respect to the first InP-based optical waveguide, and/or the second sidewall of the dielectric planarization layer is at least partially provided with a second pattern in accordance with which the second sidewall is at least partially arranged at a second angle with respect to the second InP-based optical waveguide, the first angle and the second angle being between 10 and 170 degrees.

In this way, it is possible to even further reduce any intra-waveguide interference occurring in the first InP-based optical waveguide as a result of optical radiation originating from the first InP-based optical waveguide that upon incidence on the first sidewall of the dielectric planarization layer is reflected back into the first InP-based optical waveguide. A similar reasoning holds for a further reduction of any intra-waveguide interference occurring in the second InP-based optical waveguide of the PIC according to the invention.

It is noted that, depending on the specific requirements for the PIC, the first angle and the second angle can either be the same or different from each other. The same holds for the first pattern and the second pattern that can either be the same or different.

In an embodiment of the photonic integrated circuit according to the invention, the first pattern and/or the second pattern comprises at least one of a sawtooth pattern, an undulating pattern, and a dithered pattern.

It is noted that it is possible that the first pattern and the second pattern are both regular or irregular. It is also possible that the first pattern is regular and the second pattern is irregular and vice versa. In addition to the aforementioned regularity or irregularity, when the first pattern and/or the second pattern comprise for example a sawtooth pattern, the sawtooth pattern can be symmetric, asymmetric or partially symmetric and partially asymmetric. The same observations hold for the undulating pattern and the dithered pattern.

In an embodiment of the photonic integrated circuit according to the invention, the photonic integrated circuit further comprises a first dielectric protective layer that is arranged to cover at least the first sidewall and the second sidewall of the dielectric planarization layer.

The first dielectric layer can provide environmental protection for the PIC against environmental contaminants such as for example dust particles and moisture. The first dielectric protective layer can have a thickness between 0.5 μm and 100 μm, preferably between 0.5 μm and 10 μm. In this way, the thickness of the first dielectric protective layer should be sufficient to limit diffusion of environmental contaminants thereby enabling environmental protection for the PIC.

In an exemplary embodiment of the PIC according to the invention in accordance with which an area of the InP-based substrate is accessible via the recess that is provided in the dielectric planarization layer, the first dielectric protective layer can be arranged to cover the dielectric planarization layer, the first sloped sidewall and the second neighboring sloped sidewall of the dielectric planarization layer, and the area of the InP-based substrate that is accessible via the recess. As discussed above, in this way it is possible to achieve reduction of mechanical stress raisers and/or redistribution of mechanical stress in the first dielectric protective layer and any possible further dielectric layers that are deposited on top of the first dielectric protective layer.

In an embodiment of the photonic integrated circuit according to the invention, the photonic integrated circuit further comprises a metal layer that is arranged in electrical contact with the first InP-based optical waveguide and/or the second InP-based optical waveguide, and/or to cover at least a part of the dielectric planarization layer and/or the first dielectric protective layer.

By providing at least one of the first optical waveguide and the second optical waveguide with a metal layer, it is possible to provide at least one of them with at least one electrical contact. In this way, it is possible to take full advantage of the active optical properties of the optical waveguides. The person skilled in the art will appreciate that it is possible to apply the metal layer in contact with any one of the first optical waveguide and the second optical waveguide either before or after providing the dielectric planarization layer with the recess.

By arranging the metal layer to cover at least a part of the dielectric planarization layer and/or first dielectric protective layer, a metal track with a reduced parasitic capacitance can be provided. The person skilled in the art will appreciate that by increasing the thickness of the dielectric planarization layer and/or the thickness of the first dielectric protective layer, it is possible to further reduce the parasitic capacitance associated with the metal track.

The sloped first sidewall and the sloped second sidewall of the first dielectric protective layer that occur when the first dielectric protective layer is arranged to cover the recess provided in the underlying dielectric planarization layer, provide good edge coverage for metal tracks. As a result of the improved edge coverage for metal tracks, the PIC according to the present invention is less prone to failure due to interrupted metal tracks at level changes. Hence, the reliability of metal tracks can be improved and therefore the performance of the PIC as a whole can be improved.

In an embodiment of the photonic integrated circuit according to the invention, the first dielectric protective layer comprises one of a silicon oxide, a silicon nitride, a silicon oxynitride, an aluminum oxide, and a tantalum oxide, or a polymer-based material comprising one of a polyacrylate, a polycarbonate, a polyimide, a polyurethane, a polyxylylene, a benzocyclobutene, and a polysiloxane.

It is noted that any one of the aforementioned types of polymer-based materials can be applied to a full wafer comprising a plurality of PICs by one of spin coating, dip coating, screen printing, and vapor deposition. Alternatively, the polymer-based material can be applied to a singulated PIC that is obtained through dicing of the full wafer, by one of dip coating, screen printing, dispensing, and vapor deposition. The person skilled in the art will appreciate that in the cases that the polymer-based material is applied as a liquid phase, following its application, the polymer-based material is cured or crosslinked by exposing it to a thermal treatment and/or an ultraviolet (UV) treatment in vacuum or in a specific atmosphere including at least one of oxygen ($O_2$), argon (Ar) and nitrogen ($N_2$). As a result of the curing, a toughened or hardened polymer-based material is obtained that is suitable for providing protection to the PIC against environmental contaminants such as for example dust particles and moisture.

The person skilled in the art will appreciate that halogenation of the polymer-based material may be applied to tailor the window of transparency of the polymer-based material such that propagation of optical radiation having wavelengths in for example the range from 1300 nm to 1600 nm is reduced.

Moreover, the person skilled in the art will appreciate that a primer may be required to activate for example the surface of the dielectric planarization layer or the surface of the InP-based substrate that is accessible via the recess in the dielectric planarization layer and to improve the adhesion between the first dielectric protective layer and the activated surfaces of the aforementioned layers. It will be clear that a suitable primer can be selected taking into account the compositions of the first dielectric protective layer, the composition of the InP-based substrate and/or the dielectric planarization layer.

In an exemplary embodiment of the PIC according to the invention, the first dielectric protective layer can be a conformal coating or a planarizing coating. In this way, adequate sealing of the PIC by the first dielectric protective layer can be achieved. Furthermore, the first dielectric protective layer can provide the PIC according to the invention with an improved environmental protection. As a result, it may be possible to rely on non-hermetic packaging instead of hermetic packaging.

In an embodiment of the photonic integrated circuit according to the invention, the photonic integrated circuit further comprises a second dielectric protective layer that is arranged to cover at least a part of the metal layer and/or the first dielectric protective layer.

By applying the second dielectric protective layer, it is possible to further improve the environmental protection of the PIC against environmental contaminants such as dust particles and/or moisture. As a result, it may be possible to increasingly rely on non-hermetic packaging instead of hermetic packaging.

In an embodiment of the photonic integrated circuit according to the invention, the second dielectric protective layer comprises one of a silicon oxide, a silicon nitride, a silicon oxynitride, an aluminum oxide, and a tantalum oxide, or a polymer-based material comprising one of a polyacrylate, a polycarbonate, a polyimide, a polyurethane, a polyxylylene, a benzocyclobutene, and a polysiloxane.

The person skilled in the art will appreciate that the observations mentioned above regarding the materials that can be used for the first dielectric protective layer apply mutatis mutandis to the materials that can be used for the second dielectric protective layer.

In an embodiment of the photonic integrated circuit according to the invention, the dielectric planarization layer comprises one of a silicon oxide, a silicon nitride, a silicon oxynitride, an aluminum oxide, and a tantalum oxide, or a polymer-based material comprising one of a polyacrylate, a polycarbonate, a polyimide, a polyurethane, a polyxylylene, a benzocyclobutene, and a polysiloxane.

The person skilled in the art will appreciate that the observations mentioned above regarding the materials that can be used for the first dielectric protective layer apply mutatis mutandis to the materials that can be used for the dielectric planarization layer.

It is noted that in the event that the dielectric planarization layer comprises a standard polymer-based material, the person skilled in the art will appreciate that the standard polymer-based material may be provided with a recess that is bounded by sidewalls having a positive slope, i.e. the sidewalls are sloped in the direction of the optical waveguide that is closest, by applying a combination of photolithography and etching. Firstly, the sidewalls of the photoresist that is used to define the recess can be provided with a rounded profile. The person skilled in the art will appreciate that such a rounded profile can be obtained by applying a suitable combination of exposure conditions and thermal treatment to the photoresist. Another way to provide the photoresist with sidewalls having a rounded profile involves using a greyscale mask. After the sidewalls of the photoresist have been provided with a suitable rounded profile, the photoresist can be dry etched using for example reactive ion etching (RIE) or inductively coupled plasma etching (ICP). By carefully selecting and adjusting the process conditions and etch rates, the rounded profile of the sidewalls of the photoresist can be translated into a straight sloped profile of the sidewalls of the standard polymer layer.

The person skilled in the art will appreciate that a similar approach can be used to provide a dielectric planarization layer that comprises one of a silicon oxide, a silicon nitride, a silicon oxynitride, an aluminum oxide, and a tantalum oxide with sidewall having a straight sloped profile.

However, in the event that the dielectric planarization layer comprises polymer-based material, it is noted that it is also possible to use a photodefinable polymer material that can be patterned directly by photolithography and a wet development step. The person skilled in the art will appreciate that a sloped sidewall can be achieved again by applying a combination of exposure conditions and thermal treatment to the photodefinable polymer material.

In an embodiment of the photonic integrated circuit according to the invention, the polymer-based material comprises at least one of an organic additive and an inorganic additive.

By including at least one of said additives, which for example may be a filler, a getter or a stabilizer, it is possible to enhance at least one of environmental protection, mechanical stability, and chemical stability of the polymer-based material that can be used for at least one of the dielectric planarization layer, the first dielectric protective layer, and the second dielectric protective layer. In particular the environmental protection offered may further be improved by enhancing its capability of inhibiting chemical reactions or by enhancing its hydrophobicity against moisture. The latter can be achieved by applying thin layers of halogenated polymers or poly(p-xylylenes) by atomic layer deposition or molecular vapor deposition. As a result, the environmental protection for the PIC against environmental contaminants such as dust particles and/or moisture can be improved to a level that non-hermetic packaging can be used instead of hermetic packaging. This is beneficial for the overall costs of the PIC according to the invention.

In an embodiment of the photonic integrated circuit according to the invention, the photonic integrated circuit is provided with one of a non-hermetic package and a hermetic package.

The environmental protection and consequently the lifetime of the PIC can be improved by including the PIC in a non-hermetic package. The person skilled in the art will appreciate that the environmental protection and therefore the life-time of the PIC can be improved even further by including the PIC in a hermetic package.

In an exemplary embodiment of the InP-based PIC according to the invention, the PIC is a monolithic photonic integrated circuit.

According to another aspect of the present invention, an opto-electronic system is provided comprising a photonic integrated circuit according to the invention. The opto-electronic system can for example but not exclusively be used for telecommunication applications. In that case, the opto-electronic systems can be one of a transmitter, a receiver, a transceiver, a coherent transmitter, a coherent receiver and a coherent transceiver. Based on the above, it will be clear that the costs for the opto-electronic system according to the invention can be reduced because of the improved performance-to-cost ratio of the PIC according to the invention.

BRIEF DESCRIPTION OF THE DRAWINGS

Further features and advantages of the invention will become apparent from the description of exemplary and non-limiting embodiments of an InP-based PIC according to the present invention and of an opto-electronic system comprising such a PIC.

The person skilled in the art will appreciate that the described embodiments of the PIC and the opto-electronic system are exemplary in nature only and not to be construed as limiting the scope of protection in any way. The person skilled in the art will realize that alternatives and equivalent embodiments of the PIC and the opto-electronic system can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

FIG. 4C shows a schematic top view of the part of a seventh exemplary, non-limiting embodiment of an InP-based PIC according to the present invention, wherein a dielectric planarization layer is provided with a recess that is bounded by sloped sidewalls that are provided with an undulating pattern, the recess providing access to an area of an InP-based substrate;

DETAILED DESCRIPTION OF EMBODIMENTS

It is noted that although the presented exemplary, non-limiting embodiments of the environmentally protected PIC 1 according to the present invention involve one dielectric planarization layer 5, a first dielectric protective layer 11, one metal layer 12, and a second dielectric protective layer 13, the person skilled in the art will be able to envisage without undue burden embodiments of the PIC 1 that fall within the scope of the present invention, said embodiments involving more than one of the above-mentioned layers comprising one of a silicon oxide, a silicon nitride, a silicon oxynitride, an aluminum oxide, and a tantalum oxide, or a polymer-based material comprising one of a polyacrylate, a polycarbonate, a polyimide, a polyurethane, a polyxylylene, a benzocyclobutene, and a polysiloxane.

Figure 1A:
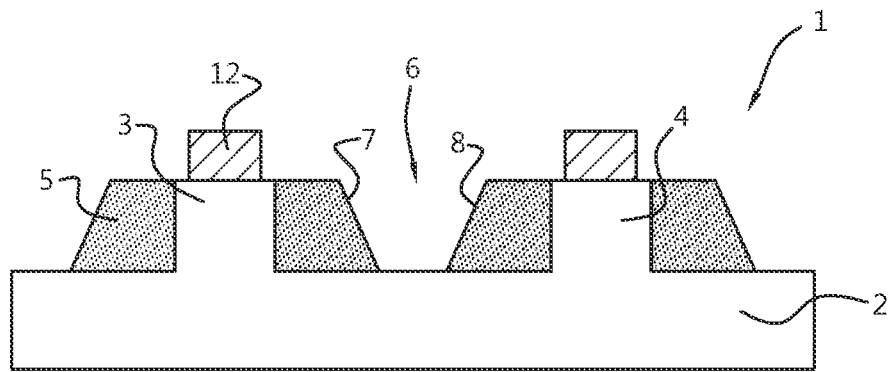
FIG. 1A shows a schematic cross-section of a part of a first exemplary, non-limiting embodiment of an InP-based PIC according to the present invention, wherein a dielectric planarization layer is provided with a recess that is bounded by sloped sidewalls, the recess providing access to an area of an InP-based substrate.

FIG. 1A shows a schematic cross-section of a part of a first exemplary, non-limiting embodiment of an InP-based PIC 1 according to the present invention. The PIC 1 comprises an InP-based substrate 2 that is provided with a first InP-based optical waveguide 3 and a neighboring second InP-based optical waveguide 4. A dielectric planarization layer 5 is provided that is arranged between the first optical waveguide 3 and the second optical waveguide 4. The dielectric planarization layer 5 is applied to enable accurate and reliable fabrication of a metal layer 12 on top of each of the first optical waveguide 3 and the second optical waveguide 4. The electrical contacts allow to take full advantage of the active optical properties of the first optical waveguide 3 and the second optical waveguide 4. The dielectric planarization layer 5 may also be configured to provide passivation and protection of the optical waveguides 3, 4 thereby improving the environmental protection of the PIC 1 according to the invention.

The dielectric planarization layer 5 may capture and propagate optical radiation originating from any one of the optical waveguides 3, 4. To at least reduce and ultimately prevent inter-waveguide interference or optical cross-talk between the first optical waveguide 3 and the neighboring second optical waveguide 4 via the dielectric planarization layer 5, between the first optical waveguide 3 and the second optical waveguide 4, the dielectric planarization layer 5 is provided with a recess 6.

At the location of the recess 6, the dielectric planarization layer 5 has a first sidewall 7 that is arranged sloped towards the first optical waveguide 3 and a second sidewall 8 that is arranged sloped towards the second optical waveguide 4.

The recess 6 provides access to an area of the InP-based substrate 2 that is bounded by the first sidewall 7 and the second sidewall 8.

By providing a slope to the first sidewall 7 and the second sidewall 8 of the dielectric planarization layer 5, a phase front of optical radiation captured by the dielectric planarization layer 5 can be tilted thereby at least reducing and ultimately preventing the optical radiation that is incident on the first sidewall 7 and the second sidewall 8 to be reflected back into the originating optical waveguide, i.e. the first optical waveguide 3 and/or the second optical waveguide 4, respectively. As a result, intra-waveguide interference in the first optical waveguide 3 and/or the second optical waveguide 4, respectively can at least be reduced and ultimately be prevented. Hence, the PIC 1 according to the present invention is less prone to inter-waveguide and intra-waveguide interference.

Furthermore, providing the dielectric planarization layer 5 with a recess 6 that is bounded by the first sidewall 7 and the second sidewall 8 that have a positive slope, i.e. that are sloped towards the first optical waveguide 3 and the second optical waveguide 4, respectively, provides the above-mentioned additional advantages in particular regarding metallization processes, mechanical stress reduction and/or mechanical stress redistribution in additional dielectric layers that can be arranged on top of the dielectric planarization layer 5, and capture of residues in for example corners between the sloped sidewalls 7, 8 of the dielectric planarization layer 5 and the InP-based substrate 2. Therefore, the person skilled in the art will appreciate that the dielectric planarization layer 5 of the PIC 1 according to the invention can be construed as a multifunctional layer.

Based on the above, the person skilled in the art will appreciate that the exemplary embodiment of the InP-based PIC 1 shown in FIG. 1A pre-empts or at least reduces at least one of the above-mentioned and/or other disadvantages associated with inter-waveguide interference and intra-waveguide interference. Moreover, the multifunctional dielectric planarization layer 5 of the PIC 1 according to the invention provides the above-mentioned additional technical advantages. As a result, the person skilled in the art will appreciate that the exemplary embodiment of the PIC 1 shown in FIG. 1A provides an improved overall performance in combination with an improved performance-to-cost ratio.

At the location of the recess 6, the first sidewall 7 and the second sidewall 8 of the dielectric planarization layer 5 are at an inclination angle $\alpha$ to the InP-based substrate 2 that is less than 85 degrees. In this way, it is possible to reduce and ultimately prevent that optical radiation that is incident on the first sloped sidewall 7 and the second sloped sidewall 8 of the dielectric planarization layer 5 is reflected back into the originating optical waveguide, i.e. the first optical waveguide 3 and/or the second optical waveguide 4, respectively. As a result, intra-waveguide interference in the first optical waveguide 3 and/or the second optical waveguide 4, respectively can at least be reduced and ultimately be prevented.

In the exemplary embodiment of the PIC 1 shown in FIG. 1A, the recess 6 is a through-hole and therefore provides access to the InP-based substrate 2 that, in between the optical waveguides 3, 4, is in contact with the dielectric planarization layer 5. The person skilled in the art will appreciate that in this case the inter-waveguide interference between the first optical waveguide 3 and the second neighboring optical waveguide 4 of the PIC 1 via the dielectric planarization layer 5 is completely prevented. The sloped first sidewall 7 and second sidewall 8 of the dielectric planarization layer 5 allow reduction and ultimately prevention of the intra-waveguide interference mentioned above.

Figure 1B:
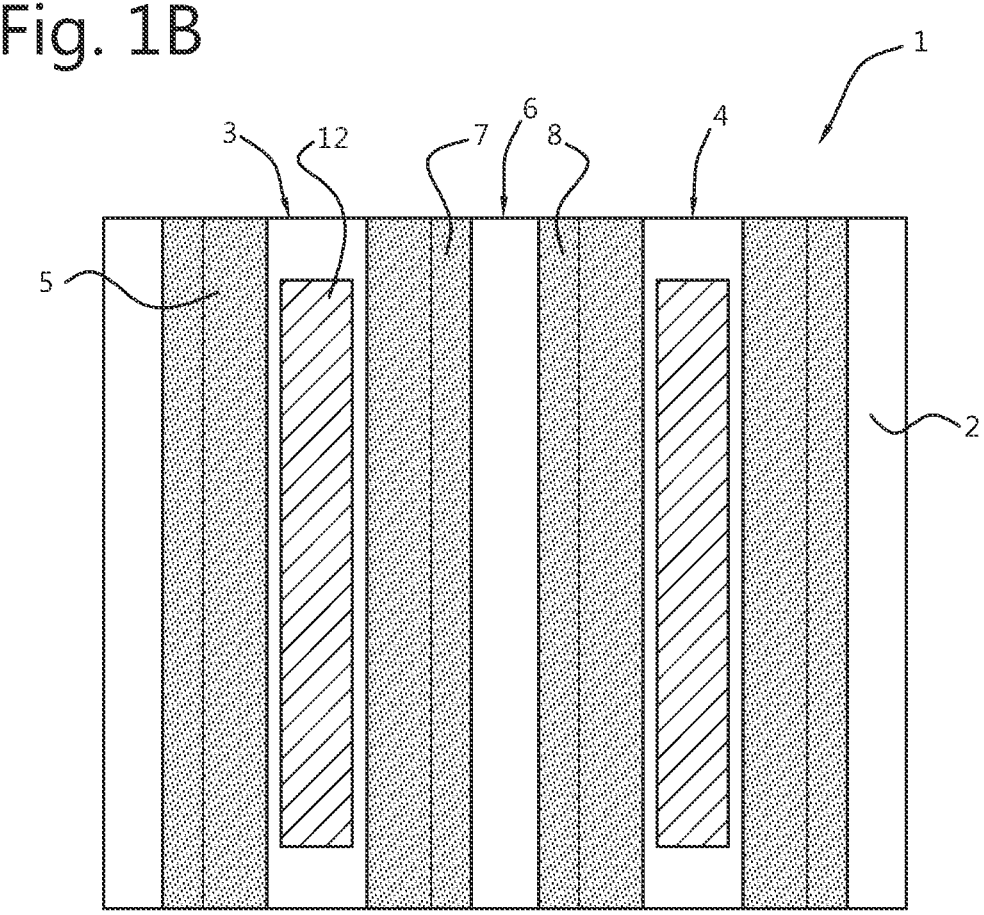
FIG. 1B shows a schematic top view of the part of the first exemplary, non-limiting embodiment of the InP-based PIC shown in FIG. 1A.

FIG. 1B shows a schematic top view of the part of the first exemplary, non-limiting embodiment of the InP-based PIC 1 shown in FIG. 1A. In accordance with the exemplary embodiment of the PIC shown in FIGS. 1A and 1B, the recess 6 has an elongated shape and is arranged to extend longitudinally between the first InP-based optical waveguide 3 and the second InP-based optical waveguide 4. The person skilled in the art will appreciate that the recess 6 can have any suitable shape as long as it allows at least reduction and ultimately prevention of inter-waveguide interference and intra-waveguide interference associated with the first InP-based optical waveguide 3 and the second neighboring InP-based optical waveguide 4. The recess 6 shown in FIG. 1B is a trench.

Figure 2:
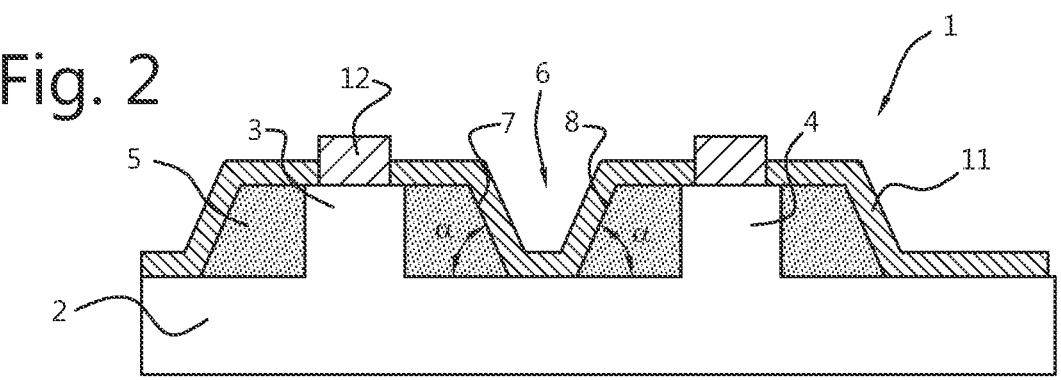
FIG. 2 shows a schematic cross-section of a part of a second exemplary, non-limiting embodiment of an InP-based PIC according to the present invention comprising a first dielectric protective layer that is in contact with the InP-based substrate at the location of the recess that is provided in the dielectric planarization layer.

FIG. 2 shows a schematic cross-section of a part of a second exemplary, non-limiting embodiment of an InP-based PIC 1 according to the present invention comprising a first dielectric protective layer 11 that is arranged to cover the dielectric planarization layer 5, the first sloped sidewall 7 and the second neighboring sloped sidewall 8 of the dielectric planarization layer 5, and the area of the InP-based substrate 2 that is accessible via the recess 6. As discussed above, in this way it is possible to achieve reduction of mechanical stress raisers and/or redistribution of mechanical stress in the first dielectric protective layer 11 and any possible further dielectric layers that are deposited on top of the first dielectric protective layer 11.

The first dielectric layer 11c can provide environmental protection for the PIC 1 against environmental contaminants such as for example dust particles and moisture. The first dielectric protective layer 11 can have a thickness between 0.5 μm and 100 μm, preferably between 0.5 μm and 10 μm. In this way, the thickness of the first dielectric protective layer 11 should be sufficient to limit diffusion of environmental contaminants thereby enabling environmental protection for the PIC 1.

Figure 3A:
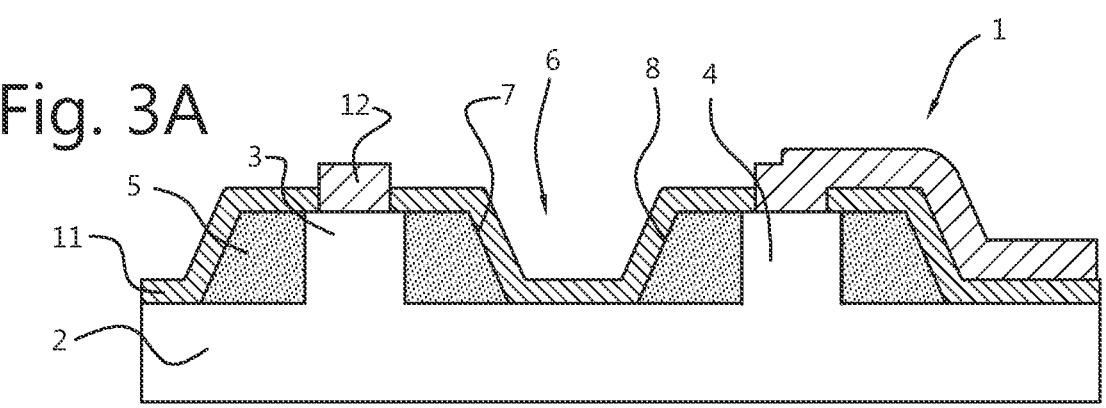
FIG. 3A shows a schematic cross-section of a part of a third exemplary, non-limiting embodiment of an InP-based PIC according to the present invention comprising a metal track that is arranged in contact with an electrical contact that is provided to an optical waveguide and that is arranged to conform to a sloped sidewall of the first dielectric protective layer that is deposited on top of the dielectric planarization layer.

FIG. 3A shows a schematic cross-section of a part of a third exemplary, non-limiting embodiment of an InP-based PIC 1 according to the present invention comprising a metal track 12 that is arranged in contact with an electrical contact that is provided to the second optical waveguide 4 and that is arranged to conform to a sloped sidewall of the first dielectric protective layer 11 that is deposited on top of the dielectric planarization layer 5.

In the exemplary embodiment of the PIC 1 shown in FIG. 3A, the metal layer 12 covers a part of the first dielectric protective layer 11. In this way, a metal track 12 with a reduced parasitic capacitance can be provided. The person skilled in the art will appreciate that by increasing the thickness of the dielectric planarization layer 5 and/or the thickness of the first dielectric protective layer 11, it is possible to further reduce the parasitic capacitance associated with the metal track 12.

Figure 3B:
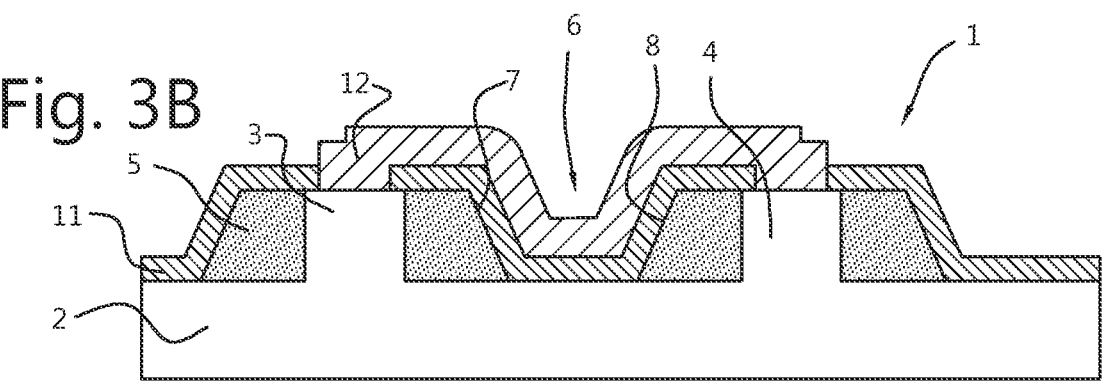
FIG. 3B shows a schematic cross-section of a part of a fourth exemplary, non-limiting embodiment of an InP-based PIC according to the present invention comprising a metal track that is arranged in contact with the electrical contacts that are provided to the optical waveguides and that is arranged to conform to the sloped sidewalls of the first dielectric protective layer that is deposited on top of the dielectric planarization layer.

FIG. 3B shows a schematic cross-section of a part of a fourth exemplary, non-limiting embodiment of an InP-based PIC 1 according to the present invention comprising a metal track 12 that is arranged in contact with the electrical contacts that are provided to the optical waveguides 3, 4 and that is arranged to conform to the sloped sidewalls of the first dielectric protective layer 11 that is deposited on top of the dielectric planarization layer 5.

The sloped first sidewall and the sloped second sidewall of the first dielectric protective layer 11 that occur as a result of the fact that the first dielectric protective layer 11 covers the recess 6 provided in the underlying dielectric planarization layer 5, provide good edge coverage for the metal track 12. As a result of the improved edge coverage for the metal track 12, the PIC 1 according to the present invention is less prone to failure due interruption of the metal track 12 at changes in the level of the underlying layers, in this case the dielectric planarization layer 5 and the first dielectric protective layer 11. Hence, the reliability of the metal track 12 can be improved and therefore the performance of the PIC 1 as a whole can be improved.

Figure 3C:
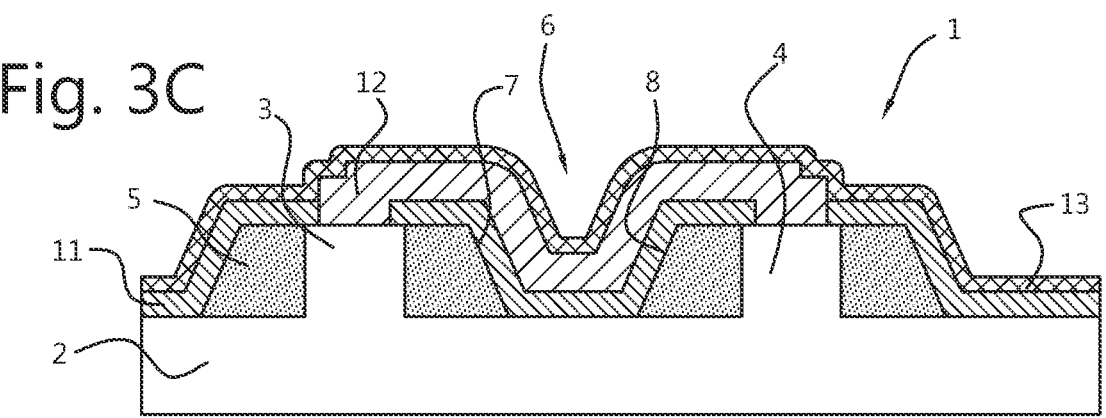
FIG. 3C shows a schematic cross-section of a part of a fifth exemplary, non-limiting embodiment of an InP-based PIC according to the present invention comprising a second dielectric protective layer that is deposited on top of a metal track that is arranged in contact with the electrical contacts that are provided to the optical waveguides and that is arranged to conform to the sloped sidewalls of the first dielectric protection layer that is deposited on top of the dielectric planarization layer.

FIG. 3C shows a schematic cross-section of a part of a fifth exemplary, non-limiting embodiment of an InP-based PIC 1 according to the present invention comprising a second dielectric protective layer 13 that is deposited on top of a metal track 12 that is arranged in contact with the electrical contacts that are provided to the optical waveguides 3, 4 and that is arranged to conform to the sloped sidewalls of the first dielectric protection layer 11 that is deposited on top of the dielectric planarization layer 5 that is provided with the recess 6.

By applying the second dielectric protective layer 13, it is possible to further improve the environmental protection of the PIC 1 against environmental contaminants such as dust particles and/or moisture. As a result, it may be possible to increasingly rely on non-hermetic packaging instead of hermetic packaging.

Figure 4A:
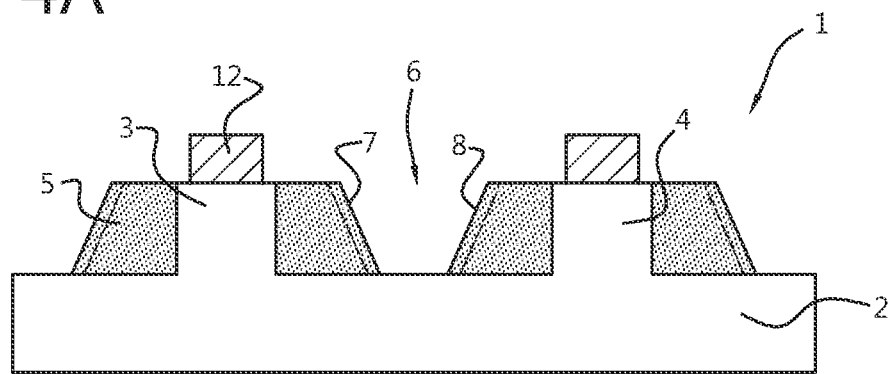
FIG. 4A shows a schematic cross-section of a part of a sixth exemplary, non-limiting embodiment of an InP-based PIC according to the present invention, wherein a dielectric planarization layer is provided with a recess that is bounded by sloped sidewalls that are provided with a sawtooth pattern, the recess providing access to an area of an InP-based substrate.

FIG. 4A shows a schematic cross-section of a part of a sixth exemplary, non-limiting embodiment of an InP-based PIC 1 according to the present invention, wherein a dielectric planarization layer 5 is provided with a recess 6 that is bounded by sloped sidewalls 7, 8 that are provided with a sawtooth pattern 9, 10. The recess 6 provides access to an area of the InP-based substrate 2.

Figure 4B:
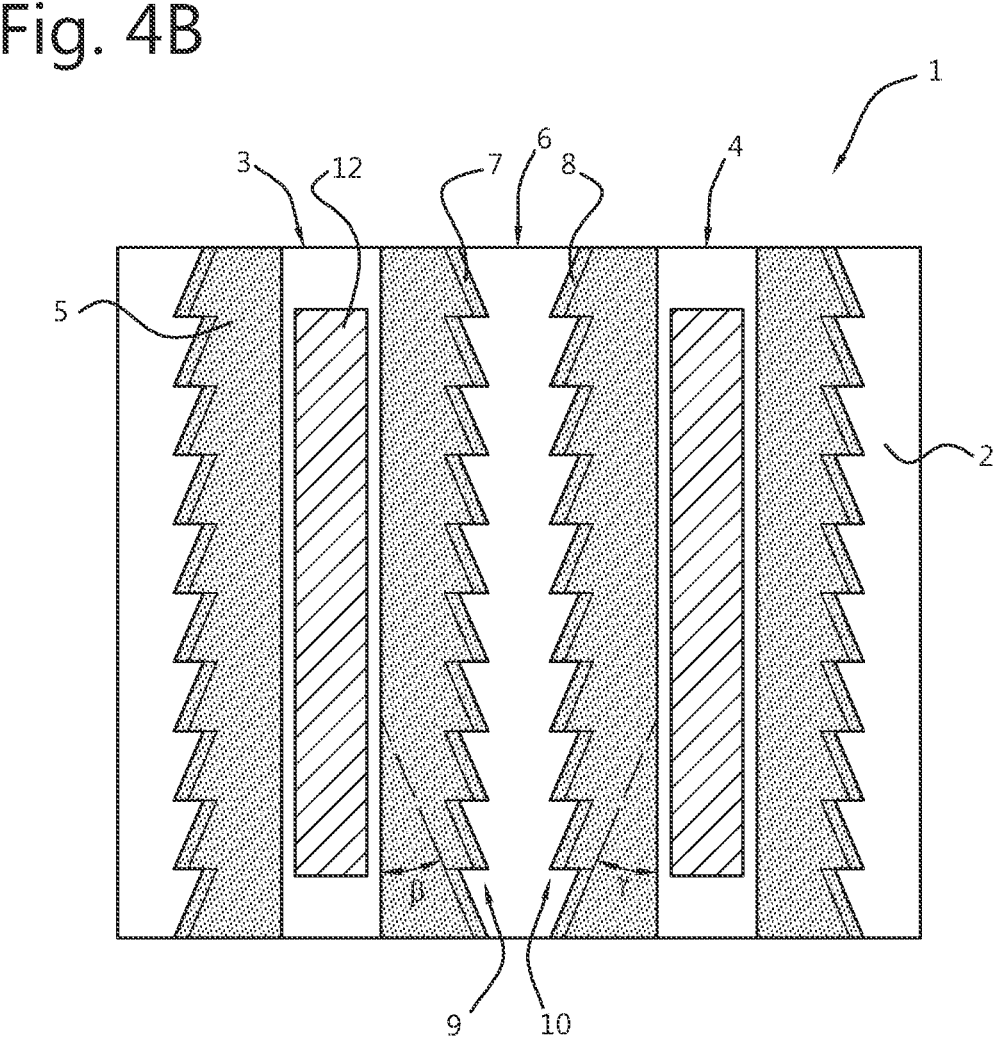
FIG. 4B shows a schematic top view of the part of the sixth exemplary, non-limiting embodiment of the InP-based PIC shown in FIG. 4A.

FIG. 4B shows a schematic top view of the part of the sixth exemplary, non-limiting embodiment of the InP-based PIC 1 shown in FIG. 4A. The first sidewall 7 of the dielectric planarization layer 5 is provided with a regular sawtooth pattern 9 in accordance with which the first sidewall 7 is at least partially arranged at a first angle β with respect to the first InP-based optical waveguide 3. The second sidewall 8 of the dielectric planarization layer 5 is also provided with a regular sawtooth pattern 10 in accordance with which the second sidewall 8 is at least partially arranged at a second angle γ with respect to the second InP-based optical waveguide 4. The first angle β and the second angle γ can be between 10 and 170 degrees. It is noted that, depending on the specific requirements for the PIC 1, the first angle β and the second angle γ can either be the same or different from each other. In the exemplary embodiment of the PIC 1 shown in FIG. 4B, the first angle β and the second angle γ are the same. A similar observation holds for the first pattern 9 and the second pattern 10 that can either be the same or different. In the exemplary embodiment of the PIC 1 shown in FIG. 4B, the first pattern 9 and the second pattern 10 are the same.

As mentioned above, the first pattern 9 and the second pattern 10 allow to even further reduce any intra-waveguide interference occurring in the first InP-based optical waveguide 3 as a result of optical radiation originating from the first InP-based optical waveguide 3 that upon incidence on the first sidewall 7 of the dielectric planarization layer 5 is reflected back into the first InP-based optical waveguide 3. A similar reasoning holds for a further reduction of any intra-waveguide interference occurring in the second InP-based optical waveguide 4 of the PIC 1 according to the invention.

FIG. 4C shows a schematic top view of the part of a seventh exemplary, non-limiting embodiment of an InP-based PIC 1 according to the present invention, wherein a dielectric planarization layer 5 is provided with a recess 6 that is bounded by sloped sidewalls 7, 8 that are provided with an undulating pattern 9, 10. The recess 6 provides access to an area of the InP-based substrate 2. Similar observations as described above in relation to the exemplary embodiment of the PIC 1 shown in FIG. 4B hold for the exemplary embodiment of the PIC 1 shown in FIG. 4C.

Figure 5:
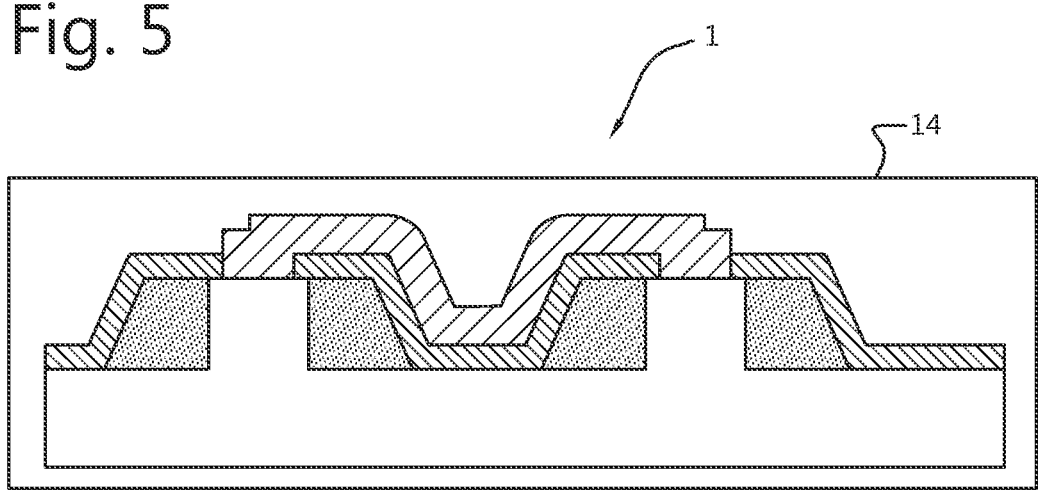
FIG. 5 shows a schematic cross-section of an eighth exemplary, non-limiting embodiment of an InP-based PIC according to the invention, wherein the PIC is provided with a hermetic package.

FIG. 5 shows a schematic cross-section of an eighth exemplary, non-limiting embodiment of an InP-based PIC 1 according to the invention, wherein the PIC 1 is provided with a hermetic package 14. As mentioned above, the hermetic package 14 can improve the environmental protection and therefore the life-time of the PIC 1. The person skilled in the art will appreciate that the PIC 1 can also be provided with a non-hermetic package (not shown). In the latter case, the environmental protection and consequently the life-time of the PIC 1 can also be improved but may be to a lesser extent.

Figure 6:
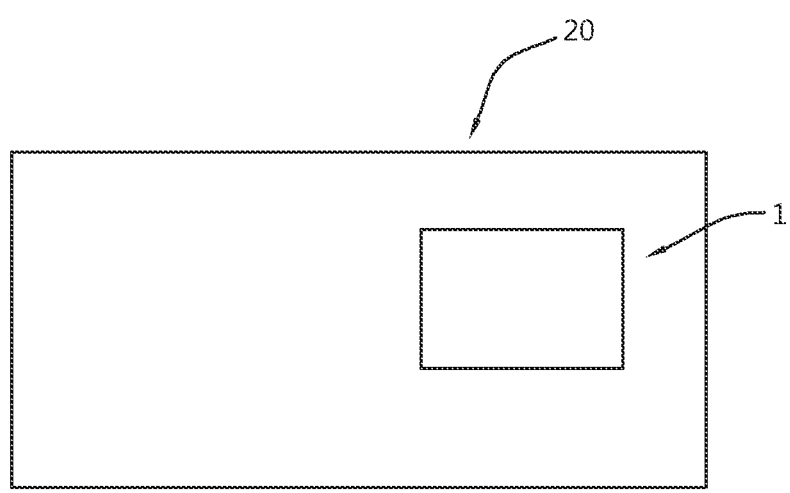
FIG. 6 shows a schematic view of a first exemplary, non-limiting embodiment of an opto-electronic system according to the invention that can be used for example but not exclusively for telecommunication applications or sensor applications, the opto-electronic system comprising an InP-based PIC according to the present invention.

FIG. 6 shows a schematic view of a first exemplary, non-limiting embodiment of an opto-electronic system 20 that can be used for example but not exclusively for telecommunication applications or sensor applications, the opto-electronic system 20 comprising a PIC 1 according to the present invention. The opto-electronic system 20 can for example be one of a transmitter, a receiver, a transceiver, a coherent transmitter, a coherent receiver and a coherent transceiver.

The present invention can be summarized as relating to a photonic integrated circuit 1 comprising an InP-based substrate 2 that is provided with a first InP-based optical waveguide 3 and a neighboring second InP-based optical waveguide 4, a dielectric planarization layer 5 that is arranged at least between the first optical waveguide 3 and the second optical waveguide 4. At least between the first optical waveguide 3 and the neighboring second optical waveguide 4, the dielectric planarization layer 5 is provided with a recess 6 that is arranged to reduce or prevent optical interaction between the first optical waveguide 3 and the second optical waveguide 4 via the dielectric planarization layer 5. At the location of the recess 6, the dielectric planarization layer 5 has a first sidewall 7 that is arranged sloped towards the first optical waveguide 3, and a second sidewall 8 that is arranged sloped towards the second optical waveguide 4. The invention also relates to an opto-electronic system 20 comprising said PIC 1.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 1 photonic integrated circuit (PIC)
2 InP-based substrate
3 first InP-based optical waveguide
4 second InP-based optical waveguide
5 dielectric planarization layer
6 recess provided in dielectric planarization layer
7 first sidewall of dielectric planarization layer
8 second sidewall of dielectric planarization layer
9 first pattern provided to first sidewall of dielectric planarization layer
10 second pattern provided to second sidewall of dielectric planarization layer
11 first dielectric protective layer
12 metal layer
13 second dielectric protective layer
14 hermetic package
20 opto-electronic system
α inclination angle of first sidewall and second sidewall to InP-based substrate
β first angle of first sidewall to first InP-based optical waveguide
γ second angle of second sidewall to second InP-based optical waveguide

What is claimed is:

1. A photonic integrated circuit comprising:
an indium phosphide, InP,-based substrate that is provided with a first InP-based optical waveguide and a neighboring second InP-based optical waveguide;
a dielectric planarization layer that is arranged at least between the first optical waveguide and the second optical waveguide, wherein at least between the first optical waveguide and the second optical waveguide, the dielectric planarization layer is provided with:
a recess that is arranged to reduce or prevent optical interaction between the first optical waveguide and the second optical waveguide via the dielectric planarization layer;
wherein at the location of the recess, the dielectric planarization layer has:
a first sidewall that is arranged sloped towards the first optical waveguide; and
a second sidewall that is arranged sloped towards the second optical waveguide; and
a first dielectric protective layer that is arranged to cover at least the first sidewall and the second sidewall of the dielectric planarization layer.

2. The photonic integrated circuit according to claim 1, wherein at the location of the recess, the first sidewall and the second sidewall of the dielectric planarization layer are at an inclination angle, α, to the InP-based substrate that is less than 85 degrees.

3. The photonic integrated circuit according to claim 2, wherein the recess is arranged to provide access to the InP-based substrate.

4. The photonic integrated circuit according to claim 1, wherein the recess is arranged to provide access to the InP-based substrate.

5. The photonic integrated circuit according to claim 1, wherein the recess has an elongated shape and is arranged to extend longitudinally between the first InP-based optical waveguide and the second InP-based optical waveguide.

6. The photonic integrated circuit according to claim 1, wherein:
the first sidewall of the dielectric planarization layer is at least partially provided with a first pattern in accordance with which the first sidewall is at least partially arranged at a first angle, β, with respect to the first InP-based optical waveguide; and/or
the second sidewall of the dielectric planarization layer is at least partially provided with a second pattern in accordance with which the second sidewall is at least partially arranged at a second angle, γ, with respect to the second InP-based optical waveguide;
the first angle and the second angle being between 10 and 170 degrees.

7. The photonic integrated circuit according to claim 6, wherein the first pattern and/or the second pattern comprises at least one of a sawtooth pattern, an undulating pattern, and a dithered pattern.

8. The photonic integrated circuit according to claim 1, further comprising a metal layer that is arranged:
in electrical contact with the first InP-based optical waveguide and/or the second InP-based optical waveguide; and/or
to cover at least a part of the dielectric planarization layer and/or the first dielectric protective layer.

9. The photonic integrated circuit according to claim 8, wherein the first dielectric protective layer comprises:
one of a silicon oxide, a silicon nitride, a silicon oxynitride, an aluminum oxide, and a tantalum oxide; or
a polymer-based material comprising one of a polyacrylate, a polycarbonate, a polyimide, a polyurethane, a polyxylylene, a benzocyclobutene, and a polysiloxane.

10. The photonic integrated circuit according to claim 8, further comprising a second dielectric protective layer that is arranged to cover at least a part of the metal layer and/or the first dielectric protective layer.

11. The photonic integrated circuit according to claim 10, wherein the second dielectric protective layer comprises:
ne of a silicon oxide, a silicon nitride, a silicon oxynitride, an aluminum oxide, and a tantalum oxide; or
a polymer-based material comprising ne of a polyacrylate, a polycarbonate, a polyimide, a polyurethane, a polyxylylene, a benzocyclobutene, and a polysiloxane.

12. The photonic integrated circuit according to claim 1, wherein the first dielectric protective layer comprises:
one of a silicon oxide, a silicon nitride, a silicon oxynitride, an aluminum oxide, and a tantalum oxide; or
a polymer-based material comprising one of a polyacrylate, a polycarbonate, a polyimide, a polyurethane, a polyxylylene, a benzocyclobutene, and a polysiloxane.

13. The photonic integrated circuit according to claim 12, further comprising a second dielectric protective layer that is arranged to cover at least a part of the metal layer and/or the first dielectric protective layer.

14. The photonic integrated circuit according to claim 13, wherein the polymer-based material comprises at least one of an organic additive and an inorganic additive.

15. The photonic integrated circuit according to claim 12, wherein the polymer-based material comprises at least one of an organic additive and an inorganic additive.

16. The photonic integrated circuit according to claim 1, wherein the dielectric planarization layer comprises:
one of a silicon oxide, a silicon nitride, a silicon oxynitride, an aluminum oxide, and a tantalum oxide; or a polymer-based material comprising one of a polyacrylate, a polycarbonate, a polyimide, a polyurethane, a polyxylylene, a benzocyclobutene, and a polysiloxane.

17. The photonic integrated circuit according to claim 16, wherein the polymer-based material comprises at least one of an organic additive and an inorganic additive.

18. The photonic integrated circuit according to claim 1, wherein the photonic integrated circuit is provided with one of a non-hermetic package and a hermetic package.

19. An opto-electronic system comprising the photonic integrated circuit according to claim 1, wherein the opto-electronic system is one of a transmitter, a receiver, a transceiver, a coherent transmitter, a coherent receiver and a coherent transceiver.

20. A photonic integrated circuit comprising:
an indium phosphide, InP,-based substrate that is provided with a first InP-based optical waveguide and a neighboring second InP-based optical waveguide;
a dielectric planarization layer that is arranged at least between the first optical waveguide and the second optical waveguide, wherein at least between the first optical waveguide and the second optical waveguide, the dielectric planarization layer is provided with:
a recess that is arranged to reduce or prevent optical interaction between the first optical waveguide and the second optical waveguide via the dielectric planarization layer;
wherein at the location of the recess, the dielectric planarization layer has:
a first sidewall that is arranged sloped towards the first optical waveguide; and
a second sidewall that is arranged sloped towards the second optical waveguide; and
wherein the recess is arranged to provide access to the InP-based substrate.

* * * * *

UNITED STATES PATENT AND TRADEMARK OFFICE
CERTIFICATE OF CORRECTION

| | |
|---|---|
| PATENT NO. | : 11,899,254 B2 |
| APPLICATION NO. | : 17/695935 |
| DATED | : February 13, 2024 |
| INVENTOR(S) | : Hoekstra |

It is certified that error appears in the above-identified patent and that said Letters Patent is hereby corrected as shown below:

In the Claims

In Claim 11, Column 16, Line 42, replace "ne" with --one-- and in Line 44, replace "ne" with --one--

Signed and Sealed this
Nineteenth Day of March, 2024

*Katherine Kelly Vidal*

Katherine Kelly Vidal
*Director of the United States Patent and Trademark Office*